(No Model.)  F. H. RICHARDS.  8 Sheets—Sheet 1.
WEIGHING MACHINE.

No. 585,982.  Patented July 6, 1897.

Witnesses:
R. W. Pittman
C. H. Reed

Inventor:
F. H. Richards (No Model.)  8 Sheets—Sheet 2.

F. H. RICHARDS.
WEIGHING MACHINE.

No. 585,982.  Patented July 6, 1897.

Witnesses:
R. W. Pittman
C. H. Reed

Inventor:
F. H. Richards.

(No Model.)  8 Sheets—Sheet 5.

F. H. RICHARDS.
WEIGHING MACHINE.

No. 585,982.  Patented July 6, 1897.

Witnesses:
R. W. Pittman
G. Reed

Inventor:
F. H. Richards (No Model.) 8 Sheets—Sheet 7.

F. H. RICHARDS.
WEIGHING MACHINE.

No. 585,982. Patented July 6, 1897.

Witnesses:

Inventor:
F. H. Richards.

(No Model.)  8 Sheets—Sheet 8.
F. H. RICHARDS.
WEIGHING MACHINE.
No. 585,982.  Patented July 6, 1897.
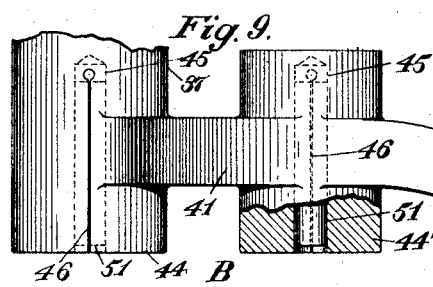
Fig. 9.
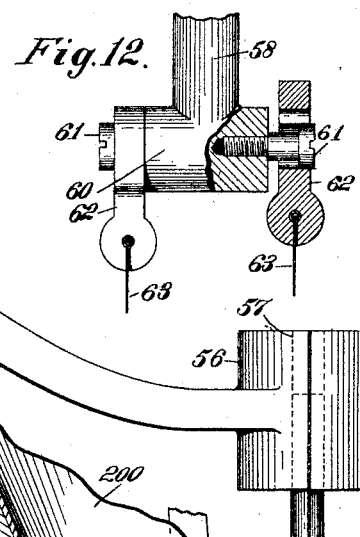
Fig. 12.
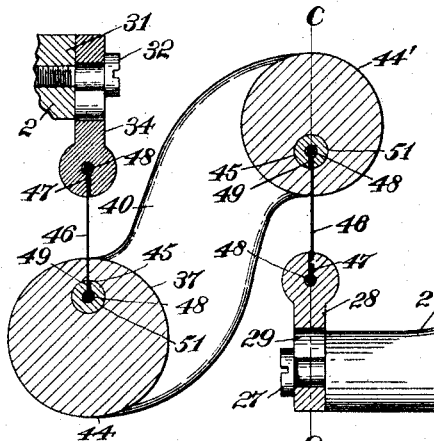
Fig. 10.
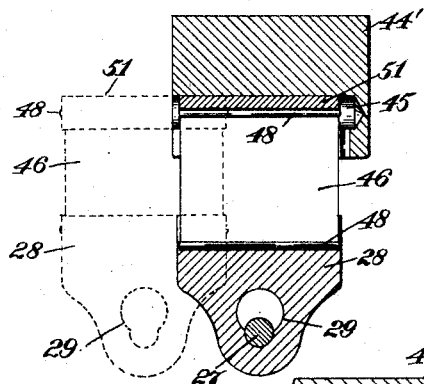
Fig. 11.
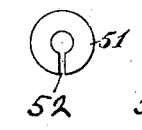
Fig. 14.
Fig. 13. Fig. 15.
Fig. 16. Fig. 18. Fig. 17.
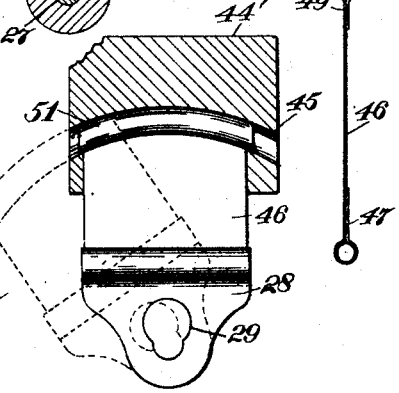
Fig. 19.
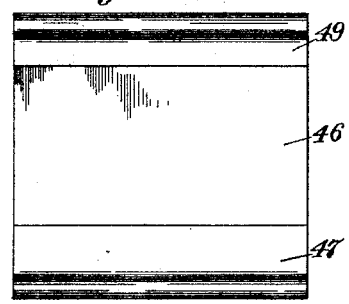
Witnesses:
R. W. Pittman
C. A. Reed
Inventor:
F. H. Richards

UNITED STATES PATENT OFFICE.

FRANCIS H. RICHARDS, OF HARTFORD, CONNECTICUT.

WEIGHING-MACHINE.

SPECIFICATION forming part of Letters Patent No. 585,982, dated July 6, 1897.

Application filed December 11, 1896. Serial No. 615,364. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Weighing-Machines, of which the following is a specification.

This invention relates to weighing-machines, the object thereof being to provide improved weighing mechanism comprehending, among other improvements, improved receptacle or bucket mechanism embodying improved means for supporting or carrying a receptacle or bucket, and also comprising improved valve mechanism and closer mechanism, all herein shown, combined, and operable to produce a weighing mechanism sensitive in action and operable with rapidity and with a high degree of efficiency and durability for weighing various kinds of material.

Figure 1:
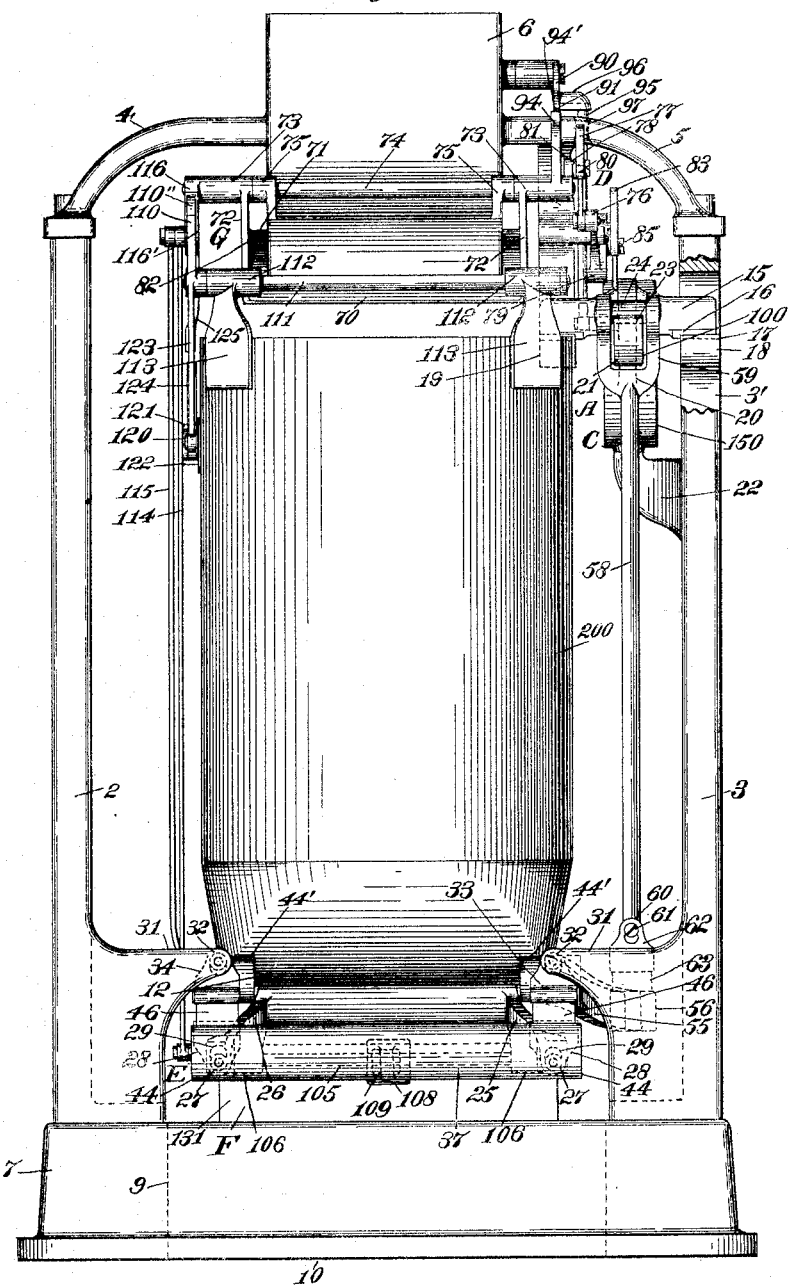
Figure 2:
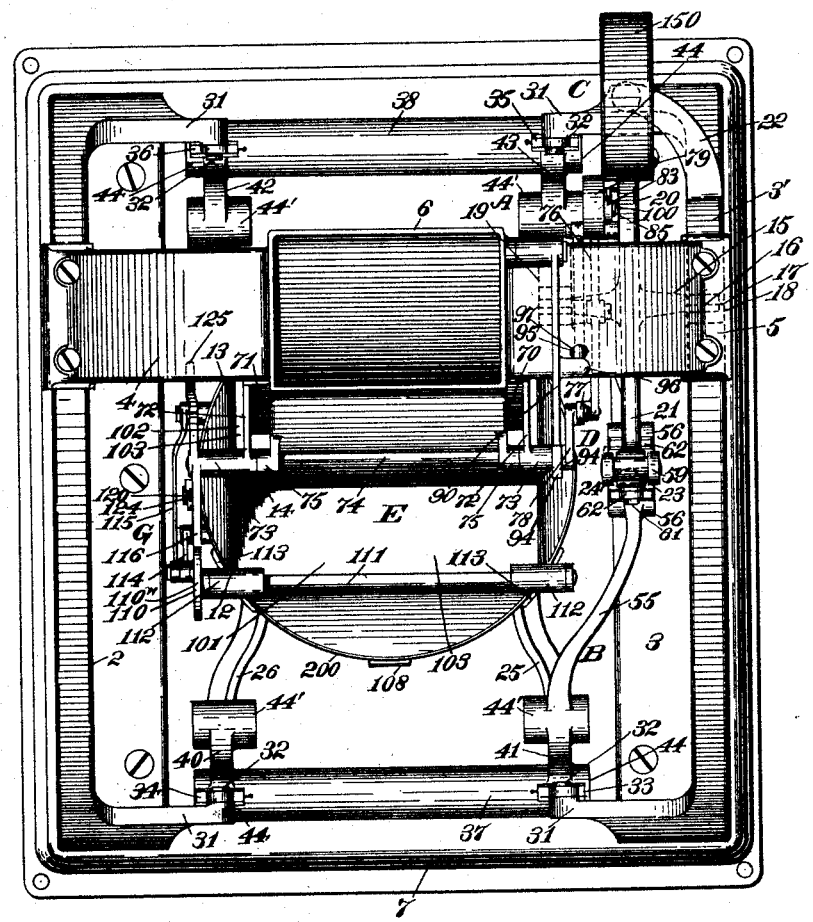
Figure 3:
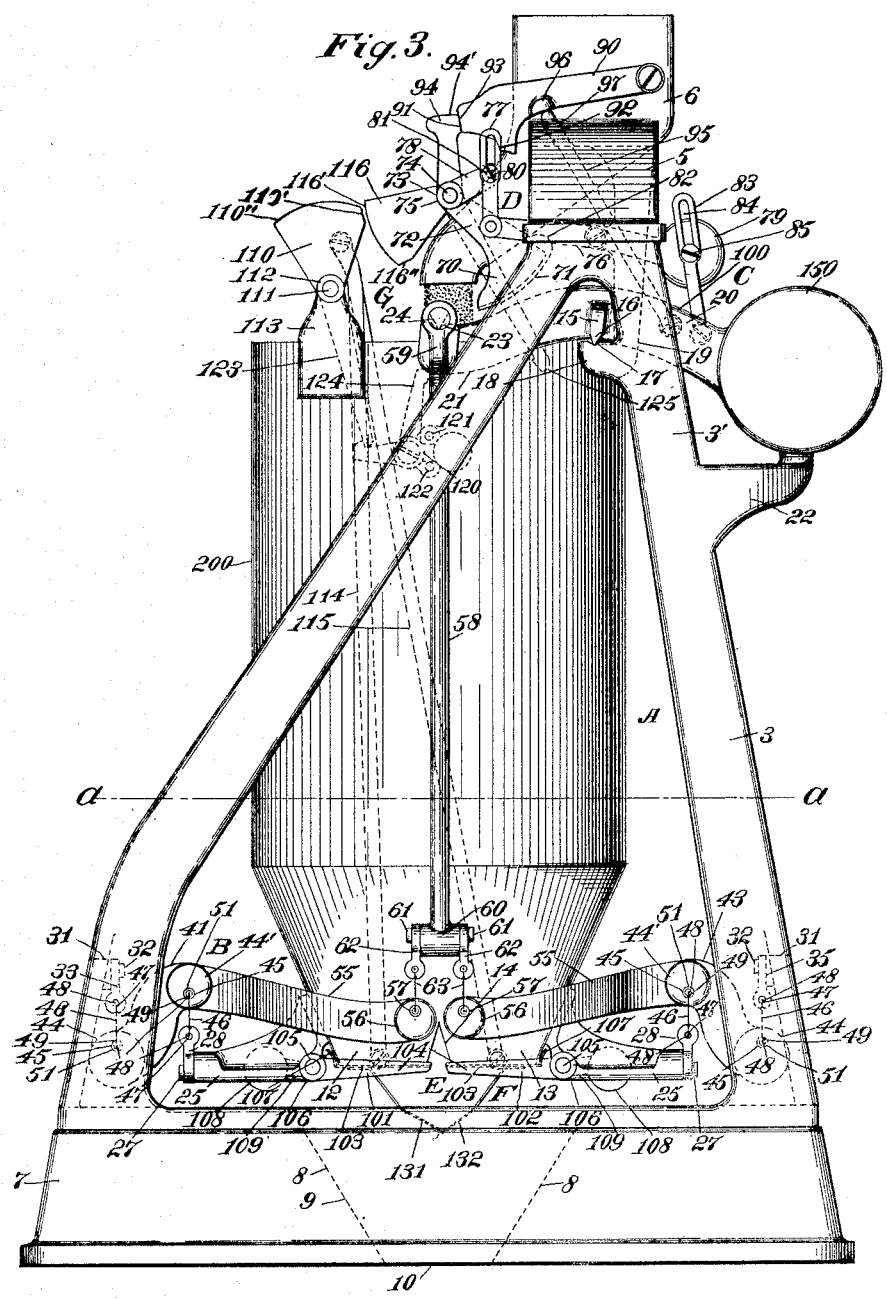
Figure 4:
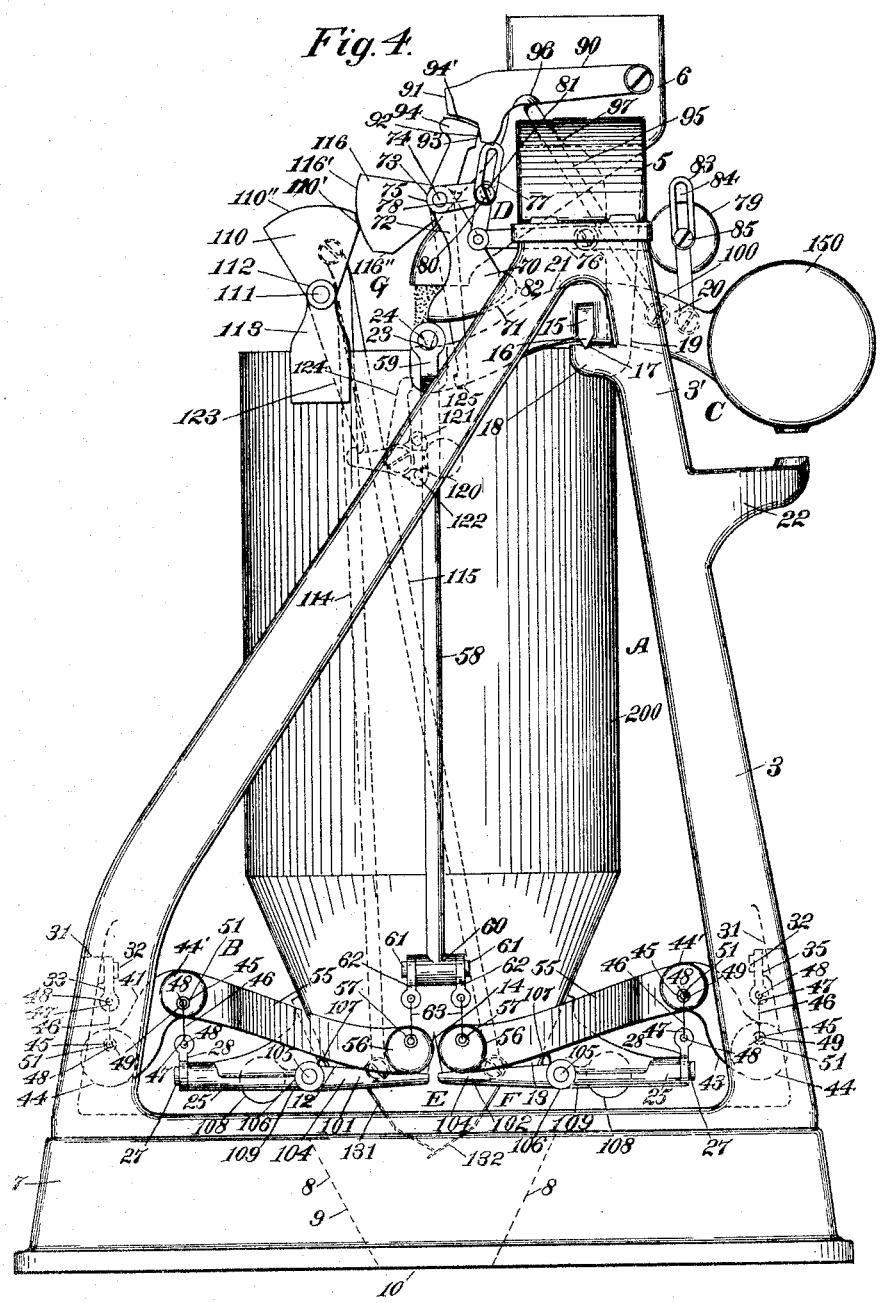
Figure 5:
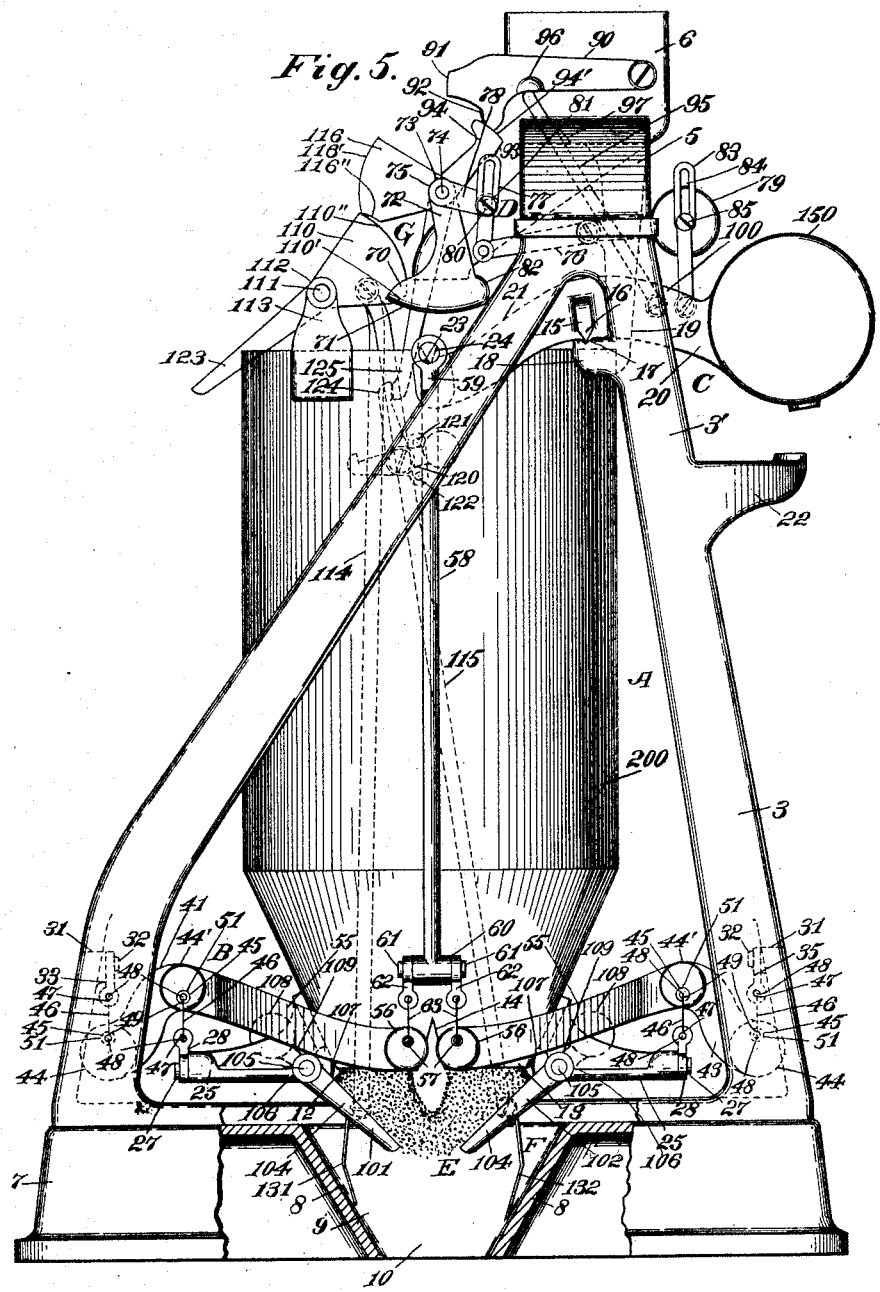
Figure 6:
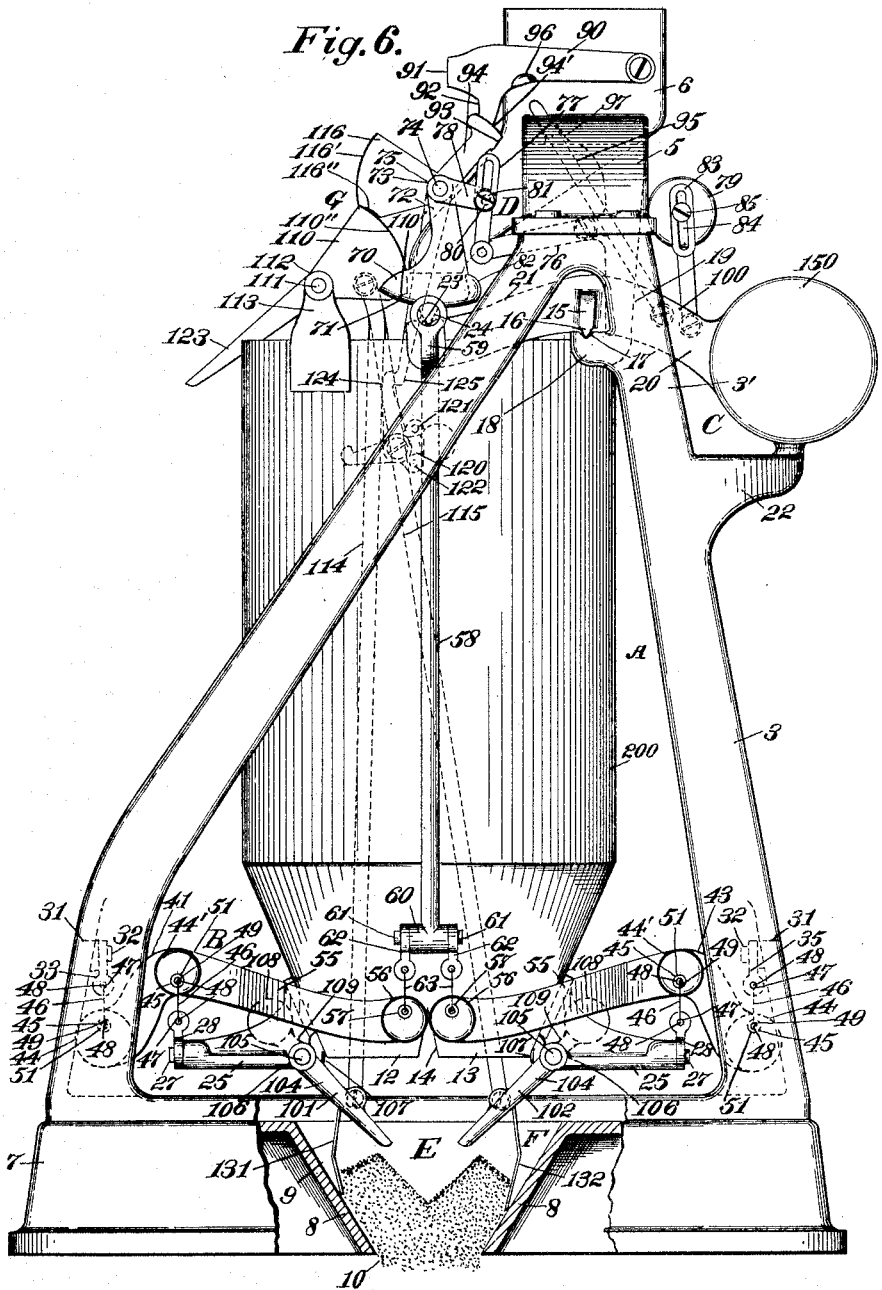
Figure 7:
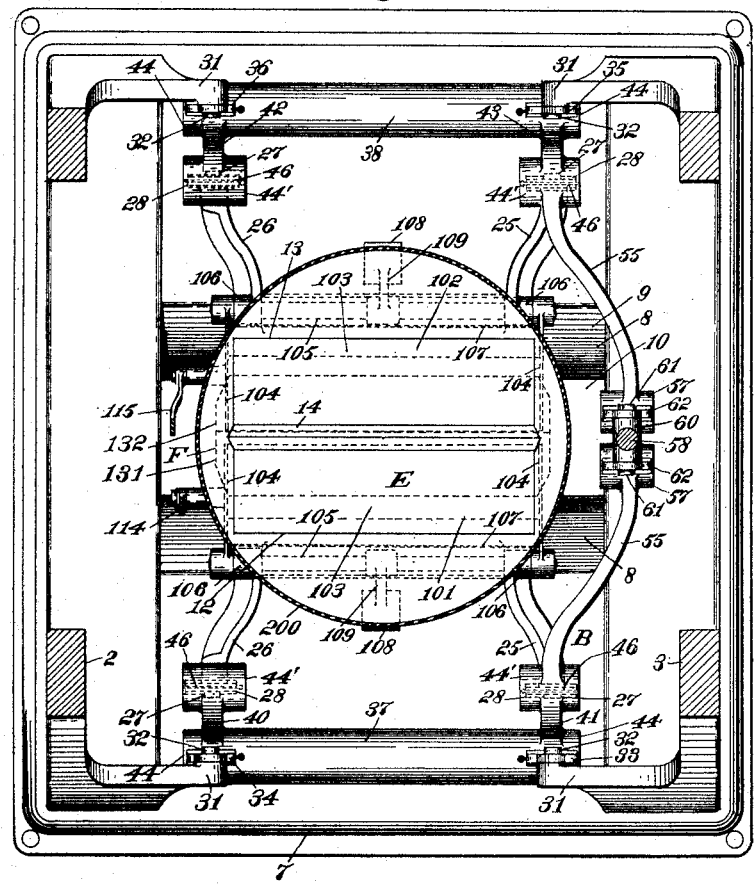
Figure 8:
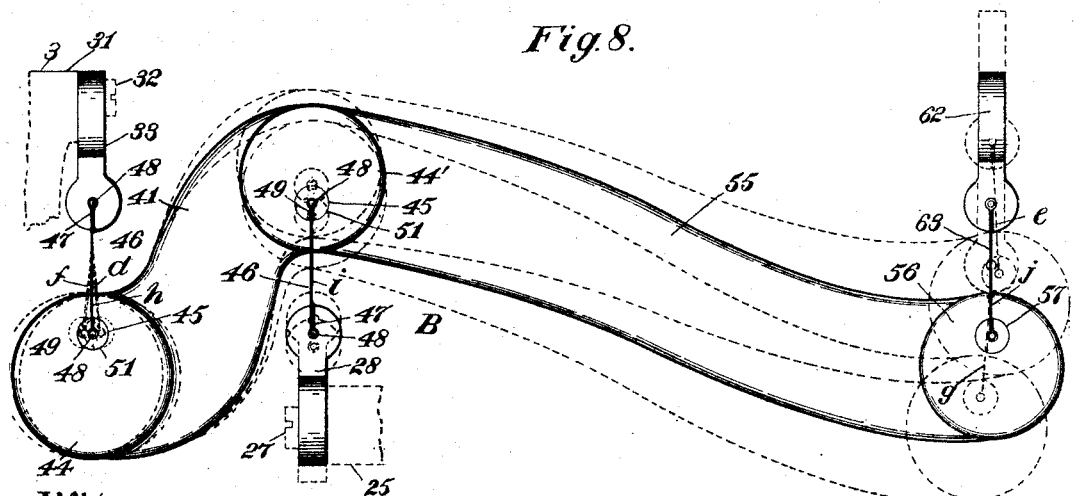

In the drawings accompanying and forming part of this specification, Figure 1 is a front view of one form of this improved weighing-machine, a part of the framework being broken away. Fig. 2 is a top or plan view thereof, parts being illustrated in dotted lines. Figs. 3, 4, 5, and 6 are right-hand side elevations of the machine, showing the operating mechanisms in various positions and with parts thereof in dotted lines. Fig. 7 is a cross-sectional top or plan view taken in line $a\ a$, Fig. 3. Fig. 8 is an enlarged detail view of one part of the supporting mechanism for the receptacle or bucket, the various positions of the same when in operation being shown in dotted lines. Fig. 9 is a top view of the same partly in section and illustrating one of the pivot-bearing members partly withdrawn. Fig. 10 is a partly-sectional view of the lower part of a bucket or receptacle and a sectional view of a portion of this improved supporting means in connection therewith. Fig. 11 is a sectional view of a tension-pivot, taken in line $c\ c$, Fig. 10, and shown in dotted lines partly withdrawn from the hub of its carrying member or lever. Fig. 12 is a detail view, partly in section, of a part of a connector or connecting means used between this improved supporting means and the scale-beam and illustrating the manner of placing a hanger in position on its pivotal device. Figs. 13 to 18 are detail views of the tension-pivot and its adjuncts, and Fig. 19 is a view of another form of such tension-pivot.

Similar characters designate like parts in all the figures of the drawings.

In a general way one of the improvements of this improved weighing mechanism relates to the load-receiver, receptacle, or bucket mechanism—more particularly to that part thereof herein preferably designated as the "supporting" or "carrying" means for the receptacle or bucket, and by means of which the same is not only carried with firmness and durability, but with great delicacy and sensitiveness, such supporting mechanism being capable of automatically adjusting and thereby equalizing itself to overcome any shifting of the bucket or receptacle or any defects in the construction of the machine, whereby the operating mechanisms thereof are always maintained at an equilibrium.

As a preface to a description of this improved weighing mechanism it will be understood that not only could the various parts be more or less modified without departing from the general scope of this invention, but this improved receptacle or bucket mechanism, valve mechanism, or closer mechanism could be independently used with other kinds of weighing apparatus such as heretofore patented by me, a more particular reference to which, however, is not deemed necessary, owing to the number and variety of the same, or, if desired, the closers and valve could be operated by other means than that herein shown in connection with the receptacle mechanism hereof. It will also be, furthermore, understood that while the receptacle or bucket is herein illustrated provided with a pair of closers such construction is not necessary, as the same could be provided with a less or greater number thereof without varying the material results of the invention.

This improved weighing machine or mechanism comprehends in a general way means or a chute for supplying the material; bucket, receptacle, or load-receiver mechanism (designated generally by A) comprehending supporting means or mechanism (designated in a general way by B) for supporting or carrying a load-receiver, receptacle, or bucket and which supporting means or mechanism is herein shown preferably embodying, as a part thereof, beam mechanism, (designated in a general way by C;) valve mechanism (designated in a general way by D) for regulating the supply of material to the receptacle and which valve mechanism is herein shown in one preferred form thereof having or embodying means for opening and for locking the valve open; closer mechanism (designated in a general way by E) for the discharge outlets or spouts of the receptacle or bucket and which closer mechanism in the form illustrated comprises main and supplemental closers, the latter operable not only to prevent drip or leakage of the main closers, but also as regulating means or mechanism operable by the discharging material to regulate the shutting of such main closers; means (designated in a general way by F) for locking the valve closed when the closers are open and for locking the closers shut when the valve is open and which will be herein referred to for the purposes of this specification as "valve-closer-locking means," as contradistinguished from the independent or supplemental closer-locking means, (designated in a general way by G.)

The framework for carrying the operative parts of the mechanism may be of any suitable and desired construction, but is herein shown preferably comprising two skeleton side frames 2 and 3, each having suitably secured thereto a top plate 4 and 5, (shown curved,) the inner opposing ends of which support means for supplying the material to the receptacle and shown herein in the nature of a supply-chute 6. In this form of machine the supply-chute and top plates are shown as one integral structure bolted to the side frames. These side frames are connected at the bottom by a base 7, (illustrated in this instance as a "rectangular" base,) having centrally thereof and in position beneath the discharge-opening of the bucket, hereinafter set forth, a pair of inclined walls 8, forming a hopper 9, provided with the usual outlet 10.

The material or load receiver or receptacle (shown in this instance as a bucket and designated generally by 200) which forms a part of the bucket or receptacle mechanism (designated generally by A) may likewise be of any desired construction, but it is herein illustrated, preferably, of the "single-chambered" type or class and cylindrical in shape and provided, in this structure, with a pair of outlet or discharge openings or spouts 12 and 13, preferably separated by an inverted-V-shaped wall 14 and closable by the closers hereinafter described.

The beam mechanism in its preferred form shown, (designated in a general way by C,) which, as hereinbefore set forth, constitutes in this form of structure a part of the supporting or carrying mechanism for the bucket or receptacle, comprehends a scale-beam 100, (shown in this instance disposed for oscillation at one side of the bucket or receptacle 200.) This scale-beam is illustrated supported below one of the top plates, as 5, by a suitable bearing or bearings, and for this purpose it is provided with a transverse member or bar 15, the under edge of which at each side of the beam constitutes one member of a bearing, which in this instance is shown as the pivot member thereof, preferably in the nature of a knife-edge pivot 16, each adapted to work in a bearing member, shown herein as V-shaped bearing members 17, one carried by a projection 18 of one of the members 3' of the skeleton side frame 3 and the other carried in alinement therewith by a bracket 19, joined at its upper end to one of the top plates, as 5.

It is obvious that other bearings might be used in place of those shown, if desired, without departing from the general scope of this invention.

The scale-beam 100 comprehends a weight-supporting arm 20 (shown extending rearwardly of the bucket) and indirectly a bucket or receptacle supporting arm 21, extending, as above set forth, at one side of the bucket and forwardly of the weight-supporting arm, and which weight-supporting arm carries a weight 150 of any suitable construction, but shown herein formed thereon, and which in its normal position or position of rest is supported by a bracket arm or support 22, extending from the rear of one of the side frames, as 3. The bucket-supporting arm 21 of the scale-beam is shown provided adjacent to its forward end with one member of a bearing, herein shown as the bearing member 23 thereof and in this instance illustrated as a V-shaped bearing member for the purpose hereinafter set forth.

The supporting or carrying mechanism (designated in a general way by B) for the bucket comprises in its preferred form herein shown and described a plurality of movable members and a series of automatically-adjustable tension members or pivots so disposed and connected with the receptacle or bucket that the equilibrium of the operating mechanisms is positively maintained at all times, whereby any defects in the construction of such mechanisms on the shifting of the receptacle or bucket will be overcome by the ability of the supporting mechanism to thoroughly and quickly adjust and equalize itself. For this purpose the bucket is shown provided with a series of arms 25 and 26, extending laterally therefrom and adjacent in the apparatus shown to the bottom thereof and illustrated in this instance as four in number, two, as 25, extending oppositely to each other at one side of the bucket, and two, as 26, extending in parallelism with the arms 25 and at the opposite side of said bucket, said arms being secured to the bucket in any desired way or formed thereon, if desired. The outer end of each of these arms is shown carrying a hanger pivotally secured thereto by a pivotal device, and for this purpose each arm end is provided with a threaded bore into which a headed bolt or screw 27 is inserted for supporting the hangers 28, each of which is illustrated provided with an opening or slot 29 (shown of differential diameters) in the nature of a keyhole-slot, whereby the hangers cannot only be readily placed in position on the shanks of their pivotal devices in a manner that will be obvious without the necessity of removing such pivotal devices, but the bucket can also be quickly and easily detached when necessary. Each of these hangers is also provided with a bore or opening, preferably of differential diameters and likewise shown in the nature of a keyhole-slot extending transversely of the pivotal axis of the hanger, and which slot communicates with the outer face of said hanger and preferably has its outer edges slightly rounded or beveled to prevent any tendency to cut or abrade the tension-pivots hereinafter described, a similar formation being likewise used for the bores or openings hereinafter set forth.

Each of the members forming each of the skeleton side frames 2 and 3 is provided with an inwardly-extending bracket or arm 31, the outer ends of which are likewise provided with pivotal devices 32 similar to those just described secured to the bucket-arms, and on which pivotal devices a series of hangers 33 and 34 and 35 and 36, likewise similar to those above described, are pivotally mounted. Secured to each pair of hangers 33 and 34 and 35 and 36, respectively, by tension members or pivots is a shaft 37 and 38, each end of which shafts in this instance forms a hub 44, and is provided with an upwardly-extending member in the nature of a lever, thus forming a series of four levers 40 and 41 and 42 and 43, the outer end of each shown herein having a transversely-extending hub 44'. In the form shown these levers are illustrated having ogee contours. Each of these levers at its hubs 44 and 44' has relatively to its plane of movement a transversely-extending bore or opening 45, (shown of differential diameters,) preferably in the nature of a keyhole-slot, the bores of the hubs 44' opening at the under side thereof, while the bores of the hubs 44 open at the upper side thereof, and each of which bores is adapted to receive one end of a tension-pivot, about to be described.

Connecting the hubs 44' of the levers with the hangers 28 of the bucket-arms and also the hubs 44 of said levers with the hangers 33 and 34 and 35 and 36 of the framework-arms 31 is a series of tension members or pivots 46, shown formed of comparatively thin spring-plates, one secured, in the construction shown, to each hanger by bending or overlapping the ends 47 of said tension-pivots around an intermediate filling member or bar 48 and inserting the same in the bores of said hangers and then compressing such hangers thereon to thus rigidly secure the pivots in position, whereby they are movable with the hangers. The opposite end 49 of each of these tension-pivots is likewise bent or formed around a similar intermediate filling member or bar 48 and secured in a bearing or bearing member 51, shown comprising a member having a longitudinal bore or opening 52, similar to the bores or openings 29 of the hangers 28, said pivot being rigidly secured therein by compressing such bearing member thereon. The bearing members and their pivots are then inserted in the openings or bores 45 of the hubs 44 and 44' of the levers, said bearing members adjustably fitting within that portion thereof having the largest diameter, whereby they are automatically adjustable, by a bodily sliding or shifting movement, to aline themselves with the walls of their bearing-bores and thereby permit the pivots to properly adjust themselves relatively to each other when placed in position and also adjust themselves to compensate for any lateral shifting movement of the bucket or of the levers.

It will be understood that instead of having the bearings or bearing members carried by the levers they might be carried by the hangers, or one might be carried by the lever while another is carried by a hanger.

In order to connect the supporting means with the beam mechanism, one lever, as 41 and 43 of each pair, at one side of the bucket is provided with a supplemental movable member or lever 55, shown herein preferably conforming to the contour of the bucket, and therefore curved outwardly, the outer ends of which are adjacent to each other and provided with transversely-extending hubs 56, similar to the hubs 44', above set forth, and which hubs 56 are provided with longitudinal bores or openings 57, similar to the bores or openings 45, and extend transversely of the plane of movement of said levers and open at the upper sides of said hubs. The means shown for connecting the beam mechanism with the supporting mechanism comprises a connector or connecting member, shown as a rod or lever 58, having a bifurcated upper end 59, carrying one member of a bearing, shown as a pivot member 24 and illustrated herein as a knife-edge pivot member adapted to engage the V-shaped bearing member 23 of the beam-arm 21, whereby such connecting rod or lever is pivotally supported by the beam for movement therewith. The lower end of this connecting member is shown provided with a cross-piece, member, or hub 60, each end of which is provided with a pivoted device 61, similar to those described for the framework and bucket-arms, and each of which supports a hanger 62, likewise similar to those heretofore described. These hangers are connected with the hubs 56 of the supplemental levers 55 by tension-pivots 63, resembling those above set forth, and which pivots are shown rigidly secured to the hangers for movement therewith, and are movable longitudinally of the hubs, and thus transversely of the plane of movement of the levers, in a like manner to that heretofore described.

From the foregoing it will thus be seen that each tension-pivot is movable with its hanger, which is pivotally carried by its means of support or pivotal device, and that such tension-pivot thus has a bodily end or sidewise shiftable or sliding movement longitudinally relatively to its hub or transversely to the plane of the pivotal axis of its hanger or the plane of movement of the levers or movable members, whereby the automatic adjustment of the pivots is at all times obtained to properly maintain and support the bucket, in a manner that will be obvious without a more prolix description, from which it will be seen that should the bucket have a shifting movement laterally the tension-pivots would bodily slide with their bearing members transversely relatively to the plane of movement of the levers, and should the levers have a shifting movement laterally with the bucket the tension-pivots carried by the framework would bodily shift relatively to the levers, and should such shifting movement of said levers be independent of the bucket all the pivots would bodily shift by such lateral movement of said levers.

By constructing the pivots with overlapping portions they are reinforced at that point thereof where they are compressed in the bearing members or hangers, and by the use of a filling member the undue compression of the enlarged ends, and the consequent withdrawal of such pivots, prevented. It will be understood, however, that the pivots might be secured to their hangers and bearing members in other ways than by compression, if desired.

In some instances the bores of the hubs 44, 44', and 56 may be curved, Fig. 19, to constitute arcs of circles, with the pivotal axes of the hangers as the centers thereof, and the bearing members similarly curved, whereby such bearing members would have a shiftable movement simultaneously with an oscillatory or swinging movement of the hangers on their pivotal axes.

It will be seen, Fig. 8, that owing to the organization and character of these tension-pivots they will, when the bucket is in its normal or unloaded position or has completely descended, be under slight flexure, (see dotted lines $d\ e$ and $f\ g$, respectively, Fig. 8,) substantially inappreciable in practice, however, so that when the bucket is at a point substantially midway of the points just stated the tension-pivots, which are always under tension, will have no flexure whatever and therefore be practically perpendicular, (see full lines $h\ i\ j$, Fig. 8,) thus reducing the lateral movement or flexure of such pivots when in operation to a minimum from that which would be the case should the flexure all come when the bucket is at its highest or at its lowest position of movement; and, furthermore, it will be observed that owing to the large extent of leverage between the pivots 63 of the supplemental levers and the pivots of the hubs 44' of the main levers as compared with the leverage intermediate such hubs 44' and the pivots of the hubs 44 only a comparatively small scale-beam weight is necessary to counterbalance the bucket or receptacle.

It will be understood that the shafts 37 and 38 might connect the movable members or levers at any other desired place than that shown, or might be dispensed with, and that other means might be used, instead of the hubs 44 and 44', for carrying the bearings or bearing members, if found desirable, the particular construction shown and described being simply for the purpose of illustrating one form of supporting mechanism.

The valve mechanism (designated in a general way by D) comprises an oscillatory or swinging valve 70, operable, in this construction of machine, to first reduce the stream of material to a drip and then completely cut off the same from the receptacle, and in the present instance it preferably comprehends a concaved valve-blade 71, carried by a pair of arms 72, one at each end thereof, and which are shown provided with hubs 73, fixedly secured to a rock-shaft 74, journaled in bearings 75 at the front side of the supply-chute.

One means shown for opening the valve at the proper predetermined period in the operation of the weighing mechanism, in order to permit the receptacle or bucket to be supplied with material, comprises weighted mechanism, one member of which in this instance is a weighted actuating-lever 76, pivotally secured to the framework—such as the bracket 19 thereof—and whereby this bracket is shown constituting not only one member of the scale-beam support, but also supporting means for the valve-operating lever or beam. It will be seen that this lever might be supported, if desired, by bearings similar to those described for supporting the scale-beam. The forward end of this valve-actuating lever 76 is connected by means of a slotted link 77 with a crank-arm 78, formed on or jointed to the hub 73 of one of the valve-arms. The opposite end of this valve-actuating lever is provided with a weight 79, which is herein shown formed thereon and by means of which the opening of the valve is secured in a manner hereinafter set forth, and which also assists in holding said valve open. Hence in order to permit such valve to close at the proper time it is desirable in this particular construction of mechanism that the weight be raised or carried upward to permit the stop-face 80, formed by the lower wall of the slot of the link 77, to be withdrawn from the crank-pin 81 of the crank-arm 78, and thus permit the valve to descend through the medium of its weight 82, which is shown formed as a part thereof, and for this purpose the weighted actuating-lever 76 is shown operatively connected with the scale-beam 100 adjacent to its weight 150, whereby they are operable simultaneously at certain periods in the operation of the apparatus. In the present structure this connection comprises a slotted link or lever 83, the lower end of which is pivotally secured to the beam, while the slot 84 thereof receives a pin or screw 85, projecting laterally from the weight, whereby on the upward movement of the main beam-weight 150 the weight 79 of the valve-actuating lever is likewise carried upward, thus withdrawing the stop-face 80 of the link 77 from the crank-pin 81 and permitting the valve to descend through the medium of its weight 82, whereby such gravity-valve is self-closable, on the downward movement of the bucket and its beam-arm, to cut off the supply of material to said bucket.

To permit the valve to be locked open while the bucket is being loaded and to also permit said valve to operate to reduce successively the size of the stream from the supply-chute to the bucket to a drip-stream and then cut off the same completely, improved means are provided for this purpose, and which in the preferred form thereof shown comprises a plurality of successively-acting stops 91 and 92, forming a locker operable through the medium of the beam mechanism to accomplish this purpose. These stops in this form of machine are carried by a lever 90, pivotally secured at one side of the supply-chute 6 in position to have its outer end, which in the present construction constitutes one of the stops, as 91, engage a stop-face 93 of an upwardly-extending arm 94, formed on or jointed to the hub 73 of one of the valve-arms, whereby the valve will be locked open.

When the bucket has been sufficiently loaded to carry it to its poising-point, it is then desirable, as above set forth, to reduce the size of the stream to a drip, this being accomplished in this structure by so actuating the stop-lever 90 that the stop 91 thereof is disengaged from the stop 93 of the arm 94, whereby the valve, by means of its weight 82, partially closes, the complete closing thereof being limited, however, by a second stop 92, which is shown herein formed in the rear of and beneath the stop 91 and which engages at this time the stop-face 93 of the arm 94, and thus limits the closing movement of the valve. When the bucket is completely loaded, this second stop is in turn disengaged from the stop-arm 94 of the valve, which is thus permitted to continue its closing movement to thoroughly and completely cut off the supply of material to the receptacle. The means shown for actuating this locker or stop-lever 90 to operate successively the stops thereof, and thus accomplish the results above set forth, is shown in this construction of mechanism as a locker-actuator or actuating-lever 95, the lower end of which is pivotally secured to the scale-beam in the rear of its pivot-bearing, while the upper end thereof is in position to engage a laterally-extending stop or projection 96, formed on the locker or stop-lever 90, whereby on the upward movement of the scale-beam weight the stop-lever is also moved upward to first operate its stop 91 out of its locking position and permit the valve to partially close and thus reduce the size of the stream and then to operate the stop 92 out of its locking position and permit such valve to completely close and thoroughly cut off the supply-stream. This locker-actuating lever 95 is illustrated projecting through an inclined aperture 97 in the top plate 5, the walls of which thus form a guide for said lever to hold the same in position at all times to perform its proper work. In this structure the weight 79 preferably forms a part of the beam mechanism in a similar manner to that described and shown in patents heretofore granted to me and to which more particular reference is not deemed necessary.

From the foregoing it will thus be clearly seen that the valve is locked open at the proper time by means of the successively-acting stops, assisted to a certain extent by the weight 79, and that such valve closes on the downward movement of the bucket without increasing the distance of the weight 79 from the scale-beam 150 as such weight moves with the beam.

The weights for the valve, as well as the other weights of the machine, will be experimentally determined in the first instance in order to secure the proper action of such valve and the other parts of the machine.

The closer mechanism (designated in a general way by E) for the discharge-outlets or spouts 12 and 13 of the bucket, in the construction shown comprises a pair of main closers 101 and 102, one for each spout or discharge-opening, and each of which is herein shown in the preferred form thereof comprehending a suitably-formed plate or closer proper, 103, having arms 104 preferably and usually formed integral therewith and secured to a shaft 105, journaled in bearings 106 of the arms 25 and 26 of the bucket. Each of the closers has its rear end formed with an upwardly-extending curved flange or plate 107, preferably struck on an arc, with the axis of the shaft 105 as the center thereof, whereby the lower wall of the bucket can be cut away at this point to permit the proper action of the closer plate or flange and which will when such closer is open prevent any leakage or outflow of grain at this point, as the upper end of the curved flange or plate 107 never moves, on the opening of the closer, below the lower edge of such bucket-wall.

To permit the closers to be self-operating to shut the spouts of the bucket after the discharge of material therefrom, suitable means is provided for actuating the same, and which means is herein shown as weights 108, carried by arms 109, one secured to each of the shafts 105 and preferably in the center of their lengths, and which weights will be sufficient to counterbalance and quickly shut the closers when the bucket is free of its load, but insufficient in themselves to maintain the same closed against the weight of the load in said bucket.

In order to prevent drip or leakage from the discharge openings or spouts of the bucket, when the closers are shut, operating to retard the descent of such bucket, supplemental closer means or mechanism is provided, which in the form shown preferably comprises a pair of closers 131 and 132, one secured in position to operate beneath each main closer 101 and 102, and each herein shown secured to or formed on its main closer in any desired manner. These closers are illustrated herein as spring members or plates, one adapted to overlap and impinge on the other when the main closers are shut and both having the lower parts thereof preferably shaped to conform somewhat to the shape of the inclined walls 8 of the hopper, whereby these supplemental closers also act in the nature of regulating mechanism to positively prevent the closing of the main closers until all appreciable amount of material has not only passed from the bucket, but also from the hopper, whereby the action of the supplemental closers thus insures the complete emptying of the bucket before a second load is permitted to be received thereby.

When the main closers are shut, one supplemental closer overlaps and impinges on the other, as above stated, and in the structure shown forms a trough below such main closers, and thus should any leakage occur from the discharge-openings of the bucket the material is received by the supplemental closers and retained thereby until the main closers open to still act as a part of the bucket-load to actuate such bucket. These supplemental closers are thus especially adapted for use in the handling of such materials as ground phosphate rock and the like and which materials, it is well known, are of a greatly-varying quality, sometimes forming in lumpy masses and at other times, especially when permeated with air, having an almost fluid character. When in this latter state, such materials are very "leaky," so that closer plates or doors perfectly adapted for holding ordinary materials will not retain such free-running materials as here referred to. By means of the main closer-doors the weight of the main load in the bucket is sustained, and by means of the supplemental spring closer-plates, set so as to overlap and impinge one upon the other, a close joint is formed by these supplemental spring-plates, whereby they are adapted to hold almost fluid granular materials.

The means for locking the closers shut when the valve is open and for locking the valve closed when the closers are open, whereby such closers are positively locked against opening so long as the valve is open and until after the same is completely closed, and whereby also the valve is positively locked closed while the closers are open and until after the same are completely shut, and which means is preferably designated, as hereinbefore set forth, as "valve-closer-locking means," as contradistinguished from the supplemental or independent closer-locking means, hereinafter described, comprises, in one form thereof shown, a plurality of stops, one carried by the bucket and operatively connected with the closers and the other operatively carried by the valve, and in this structure the stop carried by the bucket is shown as a sector-stop 110, the hub of which is secured to a shaft 111, journaled in bearings 112 of a pair of brackets 113, fixed to the bucket. This stop is connected by a pair of levers 114 and 115 with the closers, one lever being pivoted to each closer and both pivoted to said stop at a point above the pivotal point of said stop to the brackets 113, whereby the strain on the closers when the bucket is loaded comes directly on the shaft 111. Coacting with this stop 110 is a stop 116, operatively connected to the valve and preferably similar to that carried by the bucket, and it is shown mounted on one of the hubs 73 of one of the valve-arms 72 and in position to engage the bucket-stop, whereby when the valve is open the curved face 116' thereof will engage a stop-face 110' of the bucket-stop and thus lock the closers shut, and when the closers are open and the valve shut the curved face 110'' of the bucket-stop will engage a stop-face 116'' of the valve-stop and thus lock the valve closed, this being permitted as the valve-stop is carried upward on the closing of the valve, while the bucket-stop is carried downward on the descent of the bucket and swung or oscillated beneath the valve-stop by the opening of the closers, the reascent of the bucket after a part of its load has been discharged simply serving more firmly to lock the valve closed. These stops 110 and 116 are so disposed relatively to each other that the downward or descending movement of the bucket is not impeded by the valve-stop and the descending movement of the valve is not impeded by the bucket-stop, from which it will be seen that while the valve is locked closed when the closers are open such closers are, however, free to shut while such valve is still closed, and that while the closers are locked shut when the valve is open such valve is, however, free to close while such closers are locked shut and which closing action of the closers or valve of course unlocks the valve or closers, as the case may be.

As it is desirable to provide for a slight play intermediate the stops 110 and 116 when the valve is open and the closers shut, in order to eliminate friction of the same on the descent of the bucket, and thus obtain a rapid and sensitive acting mechanism, suitable independent or supplemental locking means for the closers is provided, which in itself is capable of completely and thoroughly locking the closers shut; but should such supplemental locking means be tampered with in any way the closers will nevertheless remain locked against opening by the valve-closer-locking means just described. In the form shown this supplemental or independent locking means is operable, through the medium of the valve mechanism at the proper predetermined period, to permit the closers to open, and it is illustrated herein comprehending a locker preferably comprising a shiftable weighted latch 120, pivotally secured to the bucket and operable between a pair of stops 121 and 122, which limit its movement. This locker is in position to engage the free end of a member shiftable with the sector and shown herein as a downwardly-extending lever 123, joined or formed on the hub of the stop 110, whereby when this shiftable member 123 and locker 120 are in engagement the sector-stop is prevented from oscillatory or swinging movement, and the closers thus prevented from opening. To operate this locker at the proper time to unlock the closers, the latch is shown provided with a trip member or arm 124 in position to be engaged by a member shown herein shiftable with the valve in the same plane of movement therewith and illustrated in the nature of a downwardly-extending hammer or arm 125, fixed or formed on the hub of the valve-stop, whereby on the complete closing of the valve this hammer is carried into position to strike or engage the trip-arm 124 of the latch and operate the same to release the lever 123 and permit the stop to be swung into position to allow the closers to open by the weight of the load within the bucket.

The operation of this improved weighing machine or mechanism is substantially as follows: After the bucket has received a certain amount of its load it descends to its poising-point, thus carrying the weighted end of the scale-beam 100 upward, and which, through the medium of the slotted link 83, operates to raise the supplemental weight 79 and move the stop-face 80 of the link 77 downward and also operates, simultaneously, the locker 90, by means of the lever 95, to unlock the valve and permit the same to partially close, and thus reduce the size of the supply-stream to a drip. After the bucket has received its complete load it descends from its poising-point, thus again moving the weighted end of the scale-beam upward and again actuating, by means of the lever 95, the stop-lever 90 to unlock the valve and permit the same to completely close, and thus thoroughly cut off the supply of material to the bucket. When the valve has completely cut off the supply to the bucket, a slight further movement of the same carries the hammer 125 into position to engage the trip-arm 124 of the locker 120 to thereby unlock the bucket-stop lever 123, and thereby the closers, which by the weight of the load in the bucket are immediately opened, the opening movement of the same swinging the bucket-stop 110 into position to engage the valve-stop 116 and lock the valve closed in a manner hereinbefore set forth.

On the descent of the bucket the tension-pivots at the outer ends of the bucket-arms draw the levers 40, 41, 42, and 43, at the hub portion 44' thereof, downward, which in turn, through the medium of the supplemental levers 55, which are likewise drawn downward with such levers 40, 41, 42, and 43, act to oscillate the scale-beam 100 and raise the beam-weight 150, such downward movement of these levers actuating the hubs 44 in the arc of a circle, and thus causing the tension-pivots successively to first return into their normal perpendicular position $h\ i\ j$, Fig. 8, when the bucket is substantially midway of its upper and lower positions, and then when the bucket descends below such midway point to assume a position of flexure, in practice substantially inappreciable, however, but illustrated herein on an enlarged scale by dotted lines $f\ g$, Fig. 8. It will be obvious that the tension-pivots connecting the bucket-arms also assume a position of flexure in a similar manner to the other tension-pivots, but the illustrative view Fig. 8 simply shows the flexure taking place only on the pivots at the hubs 44' and 56 thereof. After the load is completely discharged from the bucket and all appreciable amount of the same has moved out of the hopper the closers, through the medium of their weights 108, are shut, thereby swinging the bucket-stop 110 into position to unlock the valve-stop 116, such bucket-stop 110 being again locked in its normal position by the locker 120 reëngaging the lever 123. When the scale-beam 100 returned to its normal position on the ascent of the bucket, which took place after a part of the load was discharged, the supplemental weight 79, however, remained raised, owing to the locking of the valve in its closed position, so that when the valve is unlocked the weight 79 immediately descends, and thus opens the valve to permit a succeeding load to be supplied to the bucket, such valve being locked open by the locker 90, which while the valve is closed is held in raised position by the curved face 94' of the valve-stop arm 94 in readiness to reëngage the stop-face of such arm 94 immediately after the valve is opened.

Having described my invention, I claim—

1. The combination, with framework, of load-receiver mechanism embodying a load-receiver, beam mechanism, and supporting means operative with the beam mechanism and comprehending a series of movable members and a series of pivots connecting said movable members with the framework and receptacle and having an endwise or sidewise bodily-shiftable automatic adjustment relatively to their carrying or supporting means.

2. The combination, with framework, of load-receiver mechanism embodying a load-receiver, beam mechanism, and supporting means operative with the beam mechanism and comprehending a series of movable members and a series of spring-tension members or pivots connecting said movable members with the framework and receptacle and having a sliding automatic adjustment relatively to their carrying or supporting means.

3. The combination, with framework, of receptacle mechanism embodying a receptacle, beam mechanism, and supporting means operative with the beam mechanism and comprehending a series of movable members and a series of tension members or pivots connecting said movable members with the framework and receptacle, said tension members having a pivotal connection with the framework and receptacle and a sliding automatic adjustable connection with said movable members.

4. The combination, with framework, of receptacle mechanism embodying a receptacle, beam mechanism, and supporting means operative with the beam mechanism and comprehending a series of movable members and a series of tension members or pivots connecting said movable members with the framework and receptacle, said tension members having a pivotal connection with one or more of its carrying or supporting means and a sliding automatic adjustable connection with one or more of its carrying or supporting means.

5. The combination, with framework, of receptacle mechanism embodying a receptacle, beam mechanism, and supporting means operative with the beam mechanism and comprehending a plurality of levers and a plurality of tension-pivots connecting said levers with the framework and receptacle and having a sliding automatic adjustment transversely of the plane of movement of said levers.

6. The combination, with framework, of receptacle mechanism embodying a receptacle or bucket, beam mechanism, and supporting means operative with the beam mechanism and comprehending a series of levers and a series of tension-pivots connecting said levers with the framework and receptacle and having a pivotal connection with said framework and receptacle, and a sliding automatic adjustment transversely of the plane of movement of said levers.

7. The combination, with framework, of receptacle mechanism embodying a receptacle or bucket, beam mechanism, and supporting means operative with the beam mechanism and comprehending a plurality of pairs of levers, each pair being operatively connected together for simultaneous movement, and a series of tension members or pivots connecting said levers with the framework and receptacle and automatically bodily adjustable transversely of the plane of movement of said levers.

8. The combination, with framework, of receptacle mechanism embodying a receptacle or bucket, beam mechanism, and supporting means operative with the beam mechanism and comprehending a series of levers and a series of spring-plate pivots pivotally connected to said framework and bucket and having a sliding connection with said levers whereby they are automatically adjustable transversely of the plane of their pivotal axes.

9. The combination, with framework, of receptacle mechanism embodying a receptacle or bucket, beam mechanism, and supporting means connected with the beam mechanism, for directly actuating the same, and comprising a series of levers and a series of tension members or pivots connecting said levers with the framework and receptacle and having a sliding automatic adjustment transversely of the plane of movement of said levers.

10. The combination, with framework, of receptacle mechanism comprising a receptacle, beam mechanism, and supporting means connected with the beam mechanism, for directly actuating the same, and comprising a series of levers and a series of tension members or pivots pivotally connected to said framework and receptacle and having an automatically-adjustable sliding connection with said levers.

11. The combination, with framework, of receptacle mechanism embodying a receptacle or bucket, beam mechanism, and supporting means comprehending a series of movable members, a series of tension members or pivots connecting said movable members with the framework and receptacle and having a sliding automatic adjustment relatively to said movable members, a plurality of supplemental movable members connected with said movable members, a connector carried by said beam mechanism, and tension members or pivots connecting said connector and supplemental members.

12. The combination, with framework, of receptacle mechanism embodying a receptacle or bucket, beam mechanism, and supporting means comprehending a series of movable members, a series of tension members or pivots connecting said movable members with the framework and receptacle, a plurality of supplemental movable members connected with said movable members, a connector carried by said beam mechanism, and tension members or pivots connecting said connector and supplemental members and having a sliding automatic adjustment relatively to one of their carrying or supporting means.

13. The combination, with framework, of receptacle mechanism embodying a receptacle or bucket, beam mechanism, and supporting means comprehending a series of levers, a series of tension-pivots connecting said framework and receptacle with said levers, a plurality of supplemental levers connected with said levers, a connector carried by said beam mechanism, and tension-pivots pivotally connected to said connector and having an automatically-adjustable sliding connection with said supplemental levers.

14. The combination, with framework, of receptacle mechanism embodying a receptacle or bucket, beam mechanism, and supporting means comprehending a series of movable members, a series of tension members or pivots connecting said movable members with the framework and receptacle and having a sliding automatic adjustment transversely of the plane of movement of said movable members, a plurality of supplemental members connected with said movable members, a connector carried by said beam mechanism, and tension members or pivots connecting said connector and supplemental members and also having a sliding automatic adjustment transversely of the plane of movement of said supplemental members.

15. The combination, with framework, of receptacle mechanism embodying a receptacle or bucket, beam mechanism, and supporting means comprehending a series of levers, a series of tension-pivots pivotally connected to said framework and bucket and having an adjustable sliding connection with said levers, whereby said pivots are adjustable transversely of the plane of their pivotal axes and also of the plane of movement of said levers, a plurality of supplemental levers connected with said movable levers, a connector carried by said beam mechanism, and tension-pivots pivotally secured to said connector and having an adjustable sliding connection with said supplemental levers, whereby they are adjustable transversely of the plane of movement thereof.

16. The combination, with framework, of receptacle mechanism embodying a receptacle or bucket, beam mechanism comprising a counterbalanced beam supported at one side of said receptacle, and supporting means operatively connected with said beam mechanism and comprising a series of movable members and a series of tension members or pivots connecting said movable members with the framework and receptacle and automatically adjustable transversely of the plane of movement of said movable members.

17. The combination, with framework, of receptacle mechanism comprising a receptacle or bucket, beam mechanism, and supporting mechanism operatively connected with said beam mechanism and comprising a series of levers and a series of automatically end or side wise adjustable tension-pivots connecting said levers with the framework and receptacle and organized whereby they are under flexure when the receptacle is in operation at its highest or lowest position and perpendicular when said receptacle is substantially midway of such positions.

18. The combination, with framework, of receptacle mechanism embodying a receptacle or bucket, beam mechanism comprising a counterbalanced beam pivotally supported at one side of said receptacle, and supporting means operatively connected with said beam mechanism and comprising a series of levers and a series of automatically end or side wise adjustable tension-pivots connecting said levers with the framework and receptacle and organized whereby they are under flexure laterally when the receptacle is in operation at its highest or lowest position and perpendicular when said receptacle is substantially midway of such positions.

19. The combination, with framework, of receptacle mechanism comprising a receptacle or bucket, a counterweighted beam mechanism, and supporting means comprising a series of main levers, a series of automatically end or side wise adjustable tension-pivots connecting said main levers with said framework and receptacle, a series of supplemental levers connected with said main levers and of greater leverage than said main levers, whereby a comparatively light-weighted beam mechanism is required, a connecting member carried by the beam mechanism, and automatically end or side wise adjustable tension-pivots connecting said supplemental levers and connecting member.

20. The combination, with framework, of receptacle mechanism embodying a receptacle or bucket, beam mechanism, and supporting means operative with the beam mechanism and comprehending a series of levers, hangers pivotally secured to said framework and receptacle, and tension members or pivots fixedly secured to said hangers and adjustably secured to said levers, for adjustment transversely of the plane of movement of said levers.

21. The combination, with framework, of receptacle mechanism embodying a receptacle or bucket, beam mechanism, and supporting means operative with the beam mechanism and comprehending a series of levers, hangers pivotally secured to said framework and receptacle, and tension-pivots fixedly secured to said hangers and secured to said levers, for sliding adjustment transversely of the plane of movement of said levers.

22. The combination, with framework, of receptacle mechanism embodying a receptacle or bucket, beam mechanism, and supporting means comprehending a series of main levers, hangers pivotally carried by said framework and receptacle, tension members or pivots fixedly secured to said hangers and adjustably secured to said main levers, for adjustment transversely of the plane of the pivotal axes of said hangers and of the plane of movement of said levers, a plurality of supplemental levers connected to said main levers, a connector carried by said beam mechanism, hangers pivotally secured to said connector, and tension members or pivots fixedly secured to said hangers and adjustably secured to said supplemental levers, for adjustment transversely of the plane of the pivotal axes of said hangers and of the plane of movement of said levers.

23. The combination, with framework having a series of hangers secured thereto, of receptacle mechanism comprising a receptacle or bucket having a series of arms provided with hangers also secured thereto, beam mechanism, a connector carried thereby and also having a plurality of hangers secured thereto, and supporting mechanism comprising a series of levers and tension members or pivots connecting said levers with the hangers of the framework, receptacle, and connector.

24. The combination, with framework having a series of hangers pivotally secured thereto, of receptacle mechanism comprising a receptacle or bucket having a series of arms provided with hangers also pivotally secured thereto, beam mechanism, a connector carried thereby and also having a plurality of hangers pivotally secured thereto, and supporting mechanism comprising a series of levers and tension members or pivots connecting said levers with the hangers of the framework, receptacle, and connector and having a sliding adjustment transversely of the plane of movement of such levers.

25. The combination, with framework having a series of hangers pivotally secured thereto, of receptacle mechanism comprising a receptacle or bucket having a series of laterally-extending arms adjacent to the bottom thereof and also provided with hangers pivotally secured thereto, beam mechanism supported at one side of said receptacle, a connector carried thereby and likewise having a plurality of hangers pivotally secured thereto, and supporting mechanism comprising a series of levers and tension-pivots connecting said levers with the hangers of the framework, receptacle, and connector and having a sliding adjustment transversely of the plane of movement of such levers and the plane of the pivotal axes of the hangers.

26. The combination, with framework having a series of four hangers pivotally secured thereto, of receptacle mechanism comprising a receptacle or bucket provided with a series of four laterally-extending arms also having hangers pivotally secured thereto, beam mechanism supported at one side of said receptacle, a connector pivotally carried by said beam mechanism and also provided with a plurality of hangers pivotally secured thereto adjacent to its lower end, and supporting mechanism comprising a series of four main levers, two of said levers having supplemental levers of greater leverage than the main levers, and tension-pivots rigidly connected to the hangers of the framework, receptacle, and connector and connected with the levers for sliding adjustment transversely of the plane of the pivotal axes of the hangers and the plane of movement of said levers.

27. The combination, with framework having a series of hangers pivotally secured thereto, of receptacle mechanism comprising a receptacle or bucket also provided with a series of hangers pivotally secured thereto, beam mechanism, a connector pivotally carried by said beam mechanism and having a plurality of hangers pivotally secured thereto, and supporting means comprising a series of main levers and a plurality of supplemental levers extending at one side of said receptacle, tension-pivots connecting the hangers of the connector with the outer, upper ends of the supplemental levers, tension-pivots connecting the hangers of the receptacle with the under side of the main levers, and tension-pivots connecting the hangers of the framework with the upper side of said main levers.

28. The combination, with framework having a series of four hangers pivotally secured thereto, of receptacle mechanism comprising a receptacle or bucket provided with a series of four laterally-extending arms also having hangers pivotally secured thereto, beam mechanism supported at one side of said receptacle, a connector pivotally carried by said beam mechanism and having a plurality of hangers pivotally secured thereto adjacent to its lower end, and supporting mechanism comprising a series of four main levers, each pair thereof being connected by a shaft and each of said levers having a hub, and a pair of supplemental levers connected to two of the main levers at the hub portions thereof and extending at one side of said receptacle and also having hubs at their outer ends, the hubs and shaft portions of said levers carrying bearing members adjustable transversely of the plane of movement of said levers, and tension-pivots rigidly connected to said bearing members and hangers of the connector, receptacle-arms, and framework.

29. A pivot adapted for use in connection with weighing mechanism and comprising a spring member or plate having one or more enlarged ends; a filling member secured therein; and an independent bearing member into which one of said ends is secured.

30. A pivot adapted for use in connection with weighing mechanism and comprising a spring member or plate of differential thicknesses, and an independent bearing member having a bore or opening of differential diameters for the reception of said pivot.

31. A pivot comprising a spring member or plate and a hanger secured thereto and having an opening of differential diameters, whereby it can be removably secured in position on a pivotal device.

32. A pivot comprising a spring-plate having a pair of enlarged ends; a filling member in each enlarged end; a hanger rigidly secured to one end of said plate; and a bearing member rigidly secured to the opposite end thereof.

33. A pivot comprising a spring plate or member having a pair of enlarged ends; a filling member in each enlarged end; a hanger compressed on one end of said plate or member and having an opening of differential diameters, whereby it can be removably secured in position on a pivotal device; and a bearing member likewise compressed on the opposite end of said pivot.

34. A pivot comprising a spring member or plate of differential thickness, whereby it has a pair of enlarged ends; a filling member in each end thereof; a hanger having a bore or opening of differential diameters for the reception of an end of said pivot; and a bearing member also having a bore of differential diameters for the reception of the opposite end of said pivot.

35. A pivot comprising a member having a bulging end; a filling member therein; and a bearing member having a bore or opening of differential diameters for the reception of said bulging end.

36. The combination, with framework, of receptacle mechanism embodying a receptacle, beam mechanism, and supporting means operatively connected with the beam mechanism and comprising a series of movable members, each of said movable members having one or more adjustable bearings and a series of tension members or pivots secured to said framework and receptacle and fixedly secured to said bearings for adjustment therewith relatively to said movable members.

37. The combination, with framework, of receptacle mechanism embodying a receptacle, beam mechanism, and supporting means operatively connected with said beam mechanism and comprising a series of levers having adjustable bearings and a series of tension-pivots pivotally secured to said framework and receptacle and secured to said bearings for adjustment therewith transversely of the plane of movement of said levers.

38. The combination, with framework, of receptacle mechanism embodying a receptacle, beam mechanism, and supporting means operatively connected with said beam mechanism and comprehending a series of levers and a series of tension members or pivots and adjustable bearing members connecting said levers with the framework and receptacle, and each of said pivots having one of its ends rigidly secured to a bearing member, whereby it is adjustable therewith transversely of the plane of movement of the bearing-member carrying or supporting means.

39. The combination, with framework, of receptacle mechanism embodying a receptacle, beam mechanism, and supporting means operatively connected with said beam mechanism and comprehending a series of levers and a series of tension-pivots and adjustable bearing members connecting said levers with the framework and receptacle, and each of said pivots being pivotally secured at one end to its carrying or supporting means and rigidly secured at its opposite end to a bearing member, whereby it is adjustable therewith transversely of the plane of movement of the bearing-member carrying or supporting means.

40. The combination, with framework, of receptacle mechanism embodying a receptacle, beam mechanism, and supporting means connected with said beam mechanism, for directly actuating the same, and comprising a series of levers provided with a series of adjustable bearings and a series of spring tension-pivots secured to said framework and receptacle and rigidly secured to said bearing for adjustment therewith transversely of the plane of movement of said levers.

41. The combination, with framework carrying a series of pivotal devices, of receptacle mechanism embodying a receptacle likewise carrying a series of pivotal devices, beam mechanism, and supporting means operatively connected with said beam mechanism and comprising a series of levers and a series of tension-pivots comprising spring-plates each having one of its ends secured to said levers and its opposite end secured to a hanger having an opening of differential diameters, whereby it can be removably secured in position on its respective pivotal device without removing said device, and whereby also said receptacle can be quickly and easily detached from its hangers.

42. The combination, with framework carrying a series of pivotal devices, of receptacle mechanism embodying a receptacle likewise carrying a series of pivotal devices, beam mechanism, and supporting means operatively connected with said beam mechanism and comprising a series of levers having transversely-adjustable bearings and a series of tension-pivots each secured at one end to one of said bearings for movement therewith, and having its opposite end secured to a hanger having an opening of differential diameters, whereby said hanger can be placed in position on its respective pivotal device without removing such device, and whereby also said receptacle can be quickly and easily detached from its hangers.

43. The combination, with framework, of receptacle mechanism embodying a receptacle, beam mechanism carrying a connector, and supporting means comprehending a series of levers and a series of tension-pivots and adjustable bearing members connecting said framework, receptacle, and connector with said levers, and each of said pivots having one of its ends secured to one of said bearing members, whereby it is adjustable therewith transversely of the plane of movement of said levers.

44. The combination, with framework, of receptacle mechanism embodying a receptacle, beam mechanism carrying a pivotally-disposed connector, and supporting means comprehending a series of levers, a series of tension-pivots, and adjustable bearing members connecting said levers with the framework, receptacle, and connector, and each of said pivots having a pivotal connection at one end to its carrying or supporting means and a rigid connection at its opposite end to one of the bearing members, whereby it has a sliding adjustment therewith relatively to the bearing-member carrying or supporting means.

45. The combination, with framework, of receptacle mechanism embodying a receptacle, beam mechanism carrying a connector; and supporting means comprehending a series of levers having adjustable bearings, and a series of tension-pivots pivotally secured to said framework, connector, and receptacle and fixedly secured to said bearings, for adjustment therewith transversely of the plane of movement of said levers and the plane of movement of the pivotal axes of the pivots.

46. The combination, with framework, of receptacle mechanism comprising a receptacle, beam mechanism, and supporting means operatively connected with the beam mechanism and comprising a series of levers, each of said levers having bores of differential diameters, a series of hangers pivotally secured to said framework and receptacle and also having bores of differential diameters, and a series of pivots, each of said pivots having differential thicknesses and adapted to fit in the differential bores of said hangers and levers.

47. The combination, with framework, of receptacle mechanism embodying a receptacle, beam mechanism carrying a connector, and supporting means comprising a series of levers having bores of differential diameters, a sliding bearing member adjustable in that portion of each of said bores having the largest diameter, a series of hangers pivotally secured to said framework, receptacle, and connector and also having bores of differential diameters, and a series of spring pivots or plates having the ends thereof fitting in the differential bores of the hangers and bearing members, and each of said pivots having a pair of enlarged ends and a filling member in each enlarged end.

48. The combination of a load-receiver having a plurality of main closers shiftable for discharging the load, and a plurality of supplemental closers disposed below and operable with said main closers to form a trough when said main closers are shut and thereby prevent leakage from said load-receiver.

49. The combination of a load-receptacle having a plurality of main closers shiftable for discharging the load; a plurality of supplemental closers carried by and operable with said main closers to form a tight-jointed trough when said main closers are shut and thereby prevent leakage from said receptacle.

50. The combination of a load-receiver having a plurality of main closers shiftable for discharging the load; a plurality of supplemental closers disposed below and operable with said main closers and one adapted to overlap the other to form a tight-jointed trough when said main closers are shut and thereby prevent leakage from said receptacle.

51. The combination of a load-receptacle having a pair of main closers shiftable for discharging the load; and a plurality of supplemental closers secured thereto and comprising spring members one adapted to spring into position to overlap and impinge its companion closer when the main closers are shut, and thereby form a trough to prevent leakage from said receptacle.

52. The combination of a load-receiver having a plurality of closers shiftable for discharging the load, and regulating means carried by each of said closers and operable to regulate the closing movements of said closers and also form a trough when said closers are shut to prevent drip or leakage from said receptacle.

53. The combination of a load-receiver having a pair of main closers shiftable to discharge a load; and a pair of supplemental closers comprising spring members or plates adapted to spring into position to overlap and impinge against each other, to thereby form a trough below said main closers to prevent leakage or drip from said load-receiver and each of said supplemental closers being secured to one of the main closers and operable therewith to regulate the closing movements of said main closers.

54. The combination of a hopper; a load-receptacle; a pair of primary closers secured to said receptacle and shiftable for discharging the load into said hopper; and regulating means comprehending a pair of supplemental closers disposed below, carried by, and shiftable with said primary closers and comprising a pair of spring-plates one adapted to overlap the other and impinge thereon, whereby they form a tight-jointed trough below said primary closers when the latter are shut, to thereby prevent drip or leakage from said receptacle, and each of said supplemental closers having a part thereof substantially conforming in shape to one of the walls of said hopper, whereby they are operable by the discharging load to regulate the closing movement of the said primary closers.

55. The combination of beam mechanism; a load-receptacle movable therewith; a valve for regulating the supply of material to said receptacle; locking means for locking the valve wide open; and independent means operated by the beam mechanism for positively actuating said locking means to release the valve from its wide-open position and permit the same to close.

56. The combination of beam mechanism; a load-receptacle movable therewith; a valve having successive closing movements for regulating the supply of material to said receptacle; means comprising a shiftable locker, for locking the valve open in its successive operative positions; and a locker-actuator operative with the beam mechanism to engage said locker during its successive locking positions and successively release the same and thereby permit the valve, first partially to close and reduce the size of the supply-stream and then completely to cut off the same.

57. The combination of beam mechanism; a load-receptacle movable therewith; a valve having successive closing movements for regulating the supply of material to said receptacle and provided with a stop; means comprising a pivotally-disposed locker having a plurality of stops successively coacting with the valve-stop for locking the valve open in its successive operative positions; and a locker-actuator secured to the beam mechanism and operable therewith to actuate said locker successively to release the same to thereby permit the valve, first, partially to close and reduce the size of the supply-stream, and then completely to cut off the same.

58. The combination, of beam mechanism; a receptacle movable therewith; a valve having successive closing movements, for regulating the supply of material to said receptacle, and provided with a stop; a shiftable locker provided with a pair of successively-acting stops coacting with said valve-stop, to thereby lock the valve open in its successive closing movements; and a locker-actuator secured to the beam mechanism and operable therewith as it moves to its poising-point, to operate said locker to disengage one of its stops from the valve-stop and permit the valve to partially close and thereby reduce the size of the supply-stream, and operable therewith as it moves beyond its poising-point, to again actuate the same locker to release its second stop from the valve-stop and permit said valve to completely cut off the supply to said receptacle.

59. The combination, with a supply-chute, of beam mechanism; a receptacle movable therewith; a valve for regulating the supply of material to said receptacle; means shiftably secured to the supply-chute and operable to lock the valve open; and means operative with the beam mechanism, to actuate said locking means, to thereby unlock the valve and permit the same to close.

60. The combination, with a supply-chute, of beam mechanism; a receptable movable therewith; a valve having successive closing movements for regulating the supply of material to said receptacle, and provided with a stop; a locker pivotally secured to the supply-chute and provided with a plurality of successively-acting stops operable to first lock the valve wide open and then lock the same partially open to form a drip-stream; and locker-actuating means secured to the beam mechanism and operable therewith to actuate the locker and permit the valve to close.

61. The combination of beam mechanism; a load-receiver movable therewith; a valve for regulating the supply of material to said load-receiver; means for locking the valve wide open; means operated by the beam mechanism positively to actuate said locking means to permit the valve to close; and weighted mechanism operatively connected with the beam mechanism and operable independently thereof during one predetermined period to open said valve.

62. The combination of beam mechanism; a load-receptacle movable therewith; a valve for regulating the supply of material to said receptacle; means for locking the valve open; means operated by the beam mechanism to actuate said locking means to permit the valve to close; and weighted mechanism directly operated by the beam mechanism in one direction and operable independently of said beam mechanism during one predetermined period to open said valve and also adapted to assist in locking such valve open.

63. The combination, with a supply-chute, of beam mechanism; a receptacle movable therewith; a valve having successive closing movements for regulating the supply of material to said receptacle, and provided with a stop; a locker pivotally secured to the supply-chute and provided with a plurality of successively-acting stops operable to lock the valve wide open and also partially open; locker-actuating means secured to the beam mechanism and operable therewith to actuate said locker and thereby permit the valve to close; and weighted mechanism for opening said valve and operative in one direction by the beam mechanism.

64. The combination, with framework, of a supply-chute; beam mechanism supported by said framework; a load-receptable movable therewith; a valve for regulating the supply of material to said receptacle; means for opening the valve and comprising weighted mechanism also pivotally supported by the framework independently of the beam mechanism and connected with said valve and beam mechanism; a locker pivotally secured to the supply-chute and operable to lock the valve wide open; and a locker actuator secured to and operative with the beam mechanism, for actuating said locker to unlock the same and thereby permit the valve to close.

65. The combination, with a supply-chute, of beam mechanism; a receptacle movable therewith; a valve for regulating the supply of material to said receptacle; means shiftably secured to the supply-chute and operable to lock the valve open; means operative with the beam mechanism, to actuate said locking means and thereby unlock the valve and permit the same to close; and means for locking the valve closed.

66. The combination, with framework, of a supply-chute; beam mechanism supported by said framework; a load-receptacle movable therewith; a valve having successive closing positions for regulating the supply of material to said receptacle; means for opening the valve and comprising weighted mechanism also supported by the framework, independently of the beam mechanism, and connected with said valve and beam mechanism; a locker pivotally secured to the supply-chute and operative to lock the valve open in its successive closing positions; a locker-actuator secured to and operative with the beam mechanism, to actuate said locker to unlock the same from its successive locking positions and thereby permit the valve to close; and means for locking the valve closed.

67. The combination, with framework, of a supply-chute; beam mechanism supported by said framework; a receptacle movable therewith and provided with a closer shiftable for discharging the load; a valve for regulating the supply of material to said receptacle; means for opening the valve, and comprising weighted mechanism also supported by said framework and operatively connected with said valve and beam mechanism and operable in one direction simultaneously with said beam mechanism; means for locking the valve wide open, and comprising a locker shiftably secured to the supply-chute; a locker-actuator secured to and operative with the beam mechanism, for actuating said locker to unlock the same and thereby permit the valve to close; and valve-closer-locker means operable to lock the valve closed when the closer is open and to lock the closer shut when the valve is open.

68. The combination, with framework, of a supply-chute; beam mechanism carried by said framework; a load-receptacle movable therewith and provided with a closer shiftable for discharging the load; a valve for regulating the supply of material to said receptacle; means for opening said valve and comprising weighted mechanism supported by said framework above the beam mechanism and operatively connected with said beam mechanism and valve; means for locking the valve open and comprising a locker shiftably secured to said supply-chute; a locker-actuator secured to and operative with the beam mechanism, for actuating said locker to permit the valve to close; valve-closer-locking means operable to lock the valve closed when the closer is open and to lock the closer shut when the valve is open; and independent means for locking said closer shut and operative on the closing movement of said valve to unlock the closer.

69. The combination, with a supply-chute, of beam mechanism; a load-receptacle movable therewith and having a closer shiftable for discharging the load; a valve having successive closing movements for regulating the supply of material to said receptacle; means shiftably secured to the supply-chute and operable, first, to lock the valve wide open and then partially open; means operative with the beam mechanism, successively to actuate said locking means thereby to unlock the valve and permit the same to close; valve-closer-locking means operable to lock the closer shut when the valve is open and to lock the valve closed when the closer is open; and supplemental locking means for said closer and operable by and with the valve, to unlock the closer.

70. The combination, of a receptacle or bucket provided with a plurality of closers shiftable for discharging the load; a swinging valve operable to regulate the supply of material to said receptacle; valve-closer-locking means operable to lock the closers shut when the valve is open and to lock the valve closed when the closers are open, and comprising a stop carried by the valve and a stop carried by the bucket, the latter operatively connected with said closers; and supplemental means for locking the closers shut and operative by and on the closing movement of the valve, to unlock said closers, and comprising a locker carried by the bucket; a member shiftable with the bucket-stop and with which said locker coacts; and a hammer or arm swinging in the same plane of movement with said valve, for engaging said locker, to thereby actuate the same and permit the closers to open.

71. The combination of a load-receptacle provided with a pair of closers shiftable for discharging the load; a valve operable to regulate the supply of material to said receptacle; means for opening said valve on the shutting of the closers; and regulating means carried by said closers and comprising spring-plates one overlapping and impinging on the other to prevent drip or leakage from said receptacle and operable by the discharging load to regulate the shutting of the closers and thereby the opening of said valve.

72. The combination of a load-receptacle provided with a pair of main closers shiftable for discharging the load; a valve operable to regulate the supply of material to said receptacle; valve-closer-locking means operable to lock the valve closed when the closers are open and to lock the closers shut when the valve is open; supplemental locking means for said closers and operative with and by the valve on its closing movement to unlock the closers and thereby permit the same to open; and regulating mechanism carried by the closers, for regulating the shutting of said closers and thereby the opening of the valve and also operable to prevent drip or leakage from said receptacle and comprising supplemental closers comprehending a pair of overlapping and impinging spring-plates one secured to each closer and adapted to form a close-jointed trough when said main closers are shut.

73. The combination, with framework, of a supply-chute; beam mechanism carried by the framework; a load receptacle movable with said beam mechanism and having a pair of main closers shiftable for discharging the load; a valve having successive closing movements for regulating the supply of material to said receptacle; weighted mechanism also supported by said framework above said beam mechanism and operable to open said valve and also to assist in locking the same open and operatively connected with the beam mechanism; a locker carried by the supply-chute and shiftable to lock the valve open in its successive operative positions; means carried by the beam mechanism and operative therewith to actuate the locker and thereby permit the valve to close; valve-closer-locking means operable to lock the valve closed when the closers are open and to lock the closers shut when the valve is open; supplemental locking means for locking the closers shut and operative with and on the closing of the valve for unlocking said closers; and regulating mechanism carried by the closers and operable therewith to regulate the closing of the same and thereby the opening of the valve, and also operable to prevent drip or leakage from said receptacle, and comprising supplemental closers comprehending a pair of overlapping and impinging spring-plates one secured to each closer and adapted to form a close-jointed trough when said main closers are shut.

74. The combination, with framework, of beam mechanism carried thereby; a receptacle having a pair of main closers shiftable for discharging the load; supporting means for said receptacle and comprehending a series of levers and a series of tension-pivots connecting said levers with said framework, beam mechanism, and receptacle and having a sliding adjustment relatively to said levers; a valve having successive closing positions and operable to regulate the supply of material to said receptacle; means supported by the framework, for opening the valve, and operatively connected with the beam mechanism; means for locking the valve open in its successive operative positions; valve-closing-locking means for locking the valve closed when the closers are open and for locking the closers shut when the valve is open; supplemental locking means for locking the closers shut and operative with and on the closing movement of the valve, to unlock the closers; and regulating mechanism comprising a pair of supplemental closers operative by the discharging load, to regulate the closing movement of the main closers and thereby the opening of the valve.

75. The combination, with framework, of a supply-chute; beam mechanism carried by the framework; a connector pivotally supported by said beam mechanism; a receptacle movable with said beam mechanism and having a pair of closers shiftable for discharging the load; supporting means for said receptacle and comprehending a series of levers and a series of tension-pivots connecting said levers with the framework, connector, and receptacle and having a sliding adjustment transversely of the plane of movement of said levers; a swinging valve having successive closing movements, for regulating the supply of material to said receptacle; weighted mechanism pivotally supported by said framework, for opening said valve and operable also to assist in locking the same open and operatively connected with the beam mechanism, for movement therewith in one direction; a locker pivotally supported on the supply-chute and operable to lock the valve open in its successive operative positions; a locker-actuator pivotally secured to the beam mechanism and operative therewith, to actuate said locker to thereby permit the valve to close; valve-closer-locking means operative to lock the valve closed when the closers are open and to lock the closers shut when the valve is open and comprising a pair of stops, one operative with the valve and the other operative with the bucket and the latter operatively connected with each of said closers; supplemental locking means for locking the closers shut and operative with and on the closing of the valve to unlock said closers, and comprising a locker carried by the bucket and having a trip-arm, a coacting member shiftable with the bucket-stop, and a trip-arm actuator or hammer swinging in the same plane of movement with the valve and operative to trip the locker and thereby unlock the closers, to permit the same to open; and regulating mechanism carried by the closers and operable to regulate the closing movement of the same and thereby the opening movement of the valve, and comprising a pair of spring members or plates operable by the discharging load, and one adapted to overlap the other, whereby they also act as supplemental closers to prevent leakage from the receptacle.

76. The combination, with framework, of receptacle mechanism embodying a receptacle; beam mechanism; and supporting means operative with the beam mechanism and comprehending a series of levers provided with curved or arc-shaped bearing members adjustable relatively thereto, and a series of tension-pivots pivotally secured to said framework and receptacle and secured to said bearing members, for bodily adjustment therewith, in the arcs of circles, with the pivotal points of said pivots as the centers thereof.

77. The combination, with framework, of receptacle mechanism embodying a receptacle; beam mechanism carrying a connector; and supporting means comprising a series of levers having curved or arc-shaped bores and provided with curved bearing members adjustable therein, a series of hangers pivotally secured to said framework, receptacle, and connector, and a series of tension-pivots connecting said hangers with said bearing members, whereby they have a sliding adjustment transversely of the plane of movement of said levers and in the arcs of circles, with the pivotal points of said hangers as the centers thereof.

FRANCIS H. RICHARDS.

Witnesses:
 FRED. J. DOLE,
 F. N. CHASE.